(12) United States Patent
Spiegel et al.

(10) Patent No.: US 10,657,280 B2
(45) Date of Patent: May 19, 2020

(54) MITIGATION OF INJECTION SECURITY ATTACKS AGAINST NON-RELATIONAL DATABASES

(71) Applicant: SAP SE, Walldorf (DE)

(72) Inventors: Patrick Spiegel, Karlsruhe (DE); Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 15/882,043

(22) Filed: Jan. 29, 2018

(65) Prior Publication Data
US 2019/0236301 A1 Aug. 1, 2019

(51) Int. Cl.
| | | |
|---|---|---|
| *G06F 16/00* | (2019.01) | |
| *G06F 21/62* | (2013.01) | |
| *G06F 16/25* | (2019.01) | |
| *G06F 16/245* | (2019.01) | |
| *G06F 16/242* | (2019.01) | |
| *G06F 21/55* | (2013.01) | |

(52) U.S. Cl.
CPC ........ *G06F 21/6227* (2013.01); *G06F 16/245* (2019.01); *G06F 16/2433* (2019.01); *G06F 16/25* (2019.01); *G06F 21/552* (2013.01); *G06F 21/554* (2013.01)

(58) Field of Classification Search
CPC .... G06F 16/2433; G06F 16/245; G06F 16/25; G06F 21/554
See application file for complete search history.

(56) References Cited

U.S. PATENT DOCUMENTS

| | | | |
|---|---|---|---|
| 7,904,961 B2 * | 3/2011 | Ma .......................... | G06F 21/76 726/23 |
| 8,046,374 B1 | 10/2011 | Bromwich | |
| 8,429,409 B1 | 4/2013 | Wall et al. | |

(Continued)

FOREIGN PATENT DOCUMENTS

WO WO2016/122604 8/2016

OTHER PUBLICATIONS

Extended European Search Report issued in European Application No. 19152292.9 dated Jun. 18, 2019, 10 pages.

(Continued)

*Primary Examiner* — Cheryl Lewis
(74) *Attorney, Agent, or Firm* — Fish & Richardson P.C.

(57) ABSTRACT

For mitigation of injection security attacks against non-relational databases, a database driver layer is integrated with a security layer. A trigger associated with the security layer is set to implement a learning phase of the security layer. In response to enabling the trigger, queries and query parameters associated with the respective queries are received. For the queries, a previously-stored security pattern is identified based on the query and the associated query parameters. The trigger associated with the security layer is reset to implement an execution of the security patterns. In response to resetting the trigger, an additional query and additional query parameters associated with the additional query is received. A particular security pattern is identified that is associated with the additional query and the additional query parameters. At least one of the additional query parameters is determined to not match a corresponding query parameter of the particular security pattern.

20 Claims, 5 Drawing Sheets

(56) References Cited

U.S. PATENT DOCUMENTS

| | | | |
|---|---|---|---|
| 8,555,355 B2 | 10/2013 | Rathbun | |
| 8,694,784 B1 | 4/2014 | Lekies et al. | |
| 9,131,382 B1 | 9/2015 | Johns | |
| 9,509,674 B1 * | 11/2016 | Nasserbakht | G06Q 10/109 |
| 2005/0203886 A1 * | 9/2005 | Wong | G06F 21/6227 |
| 2008/0235231 A1 * | 9/2008 | Gass | G06F 21/6227 |
| 2010/0125737 A1 | 5/2010 | Kang | |
| 2011/0126010 A1 | 5/2011 | Kim et al. | |
| 2011/0185406 A1 | 7/2011 | Hirson et al. | |
| 2012/0144461 A1 | 6/2012 | Rathbun | |
| 2013/0318056 A1 | 11/2013 | Lekies et al. | |
| 2014/0041023 A1 | 2/2014 | Lekies et al. | |
| 2014/0101447 A1 | 4/2014 | Lekies et al. | |
| 2019/0361916 A1 * | 11/2019 | Weaver | G06F 16/24542 |

OTHER PUBLICATIONS

U.S. Appl. No. 13/928,872, Martin Johns, filed Jun. 27, 2013.
U.S. Appl. No. 13/928,872, Johns et al., filed Aug. 6, 2013.

* cited by examiner

MITIGATION OF INJECTION SECURITY ATTACKS AGAINST NON-RELATIONAL DATABASES

BACKGROUND

Injection attacks represent a major conventional network (for example, the Internet) application vulnerability. This class of attacks broadened with the emerging generation of non-relational databases (for example, NOSQL). For many databases, a variety of new query techniques have been introduced (such as, JAVASCRIPT OBJECT NOTATION (JSON)-based or parameterized function calls). These simplified methods lead to more straightforward database access but also introduce vulnerabilities permitting injection attacks.

NOSQL injection attacks represent a class of attacks against non-relational databases that cause unintended behavior of a query or operations associated with the query through the insertion of malicious data into a context of the query. In some implementations, these vulnerabilities originate from non-validated user input used as or as a part of a database query. Depending on the attacked database, injected input is crafted with an aim to manipulate semantical query structures executed within a database layer and affecting confidentiality, integrity or, availability of data. In general, an attacker has to influence a semantic query structure in order to compromise targeted security goals.

SUMMARY

The present disclosure describes mitigation of injection security attacks against non-relational databases. Specifically, the present disclosure describes integrating a database driver layer with a security layer. A trigger associated with the security layer is set to implement a learning phase of the security layer. In response to enabling the trigger, a plurality of queries and query parameters associated with the respective queries is received. For each query of at least a subset of the plurality of queries, a previously-stored security pattern is identified from a plurality of security patterns based on the query and the associated one or more query parameters. The trigger associated with the security layer is reset to implement an execution of the security patterns. In response to resetting the trigger, an additional query and one or more additional query parameters associated with the additional query is received. A particular security pattern from the plurality of security patterns is identified that is associated with the additional query and the additional one or more query parameters. At least one of the additional query parameters is determined to not match a corresponding query parameter of the particular security pattern.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described methodology provides protection from known injection attacks against non-relational databases utilizing a learning-based NOSQL mitigation strategy that includes a learning and an execution step. This approach allows utilizing multiple, different learning algorithms for the creation of underlying security patterns. The advantages include that the generation of the security pattern is automatic and, therefore, not prone to mistakes or omissions by developers. In some cases, a developer may not even to be aware of a potential threat, as security protection is applied automatically. Compared to strict checking and type-casting, the described approach maintains a desired flexibility with respect to the query interface, as all query formats used by the application can be learned during a training phase. Therefore, the new approach combines high-flexibility and proper protection with minimal developer effort.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes mitigation of injection security attacks against non-relational databases. Specifically, the description includes a pattern-based technique that enables an automated implementation of security patterns against injection security attacks. The description is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Injection attacks represent a major conventional network (for example, the Internet) application vulnerability. This class of attacks broadened with the emerging generation of non-relational (for example, NOSQL) databases. For many databases, a variety of new query techniques have been introduced (such as, JAVASCRIPT OBJECT NOTATION (JSON)-based or parameterized function calls). These simplified methods lead to more straightforward database access but also introduce vulnerabilities permitting injection attacks.

NOSQL injection attacks represent a class of attacks against non-relational databases that cause unintended behavior of a query or operations associated with the query through the insertion of malicious data into a context of the query. In some implementations, these vulnerabilities originate from non-validated user input used as or as a part of a database query. Depending on the attacked database, injected input is crafted with an aim to manipulate semantical query structures executed within a database layer and affecting confidentiality, integrity or, availability of data. In general, an attacker has to influence a semantic query structure in order to compromise targeted security goals.

Figure 1A:
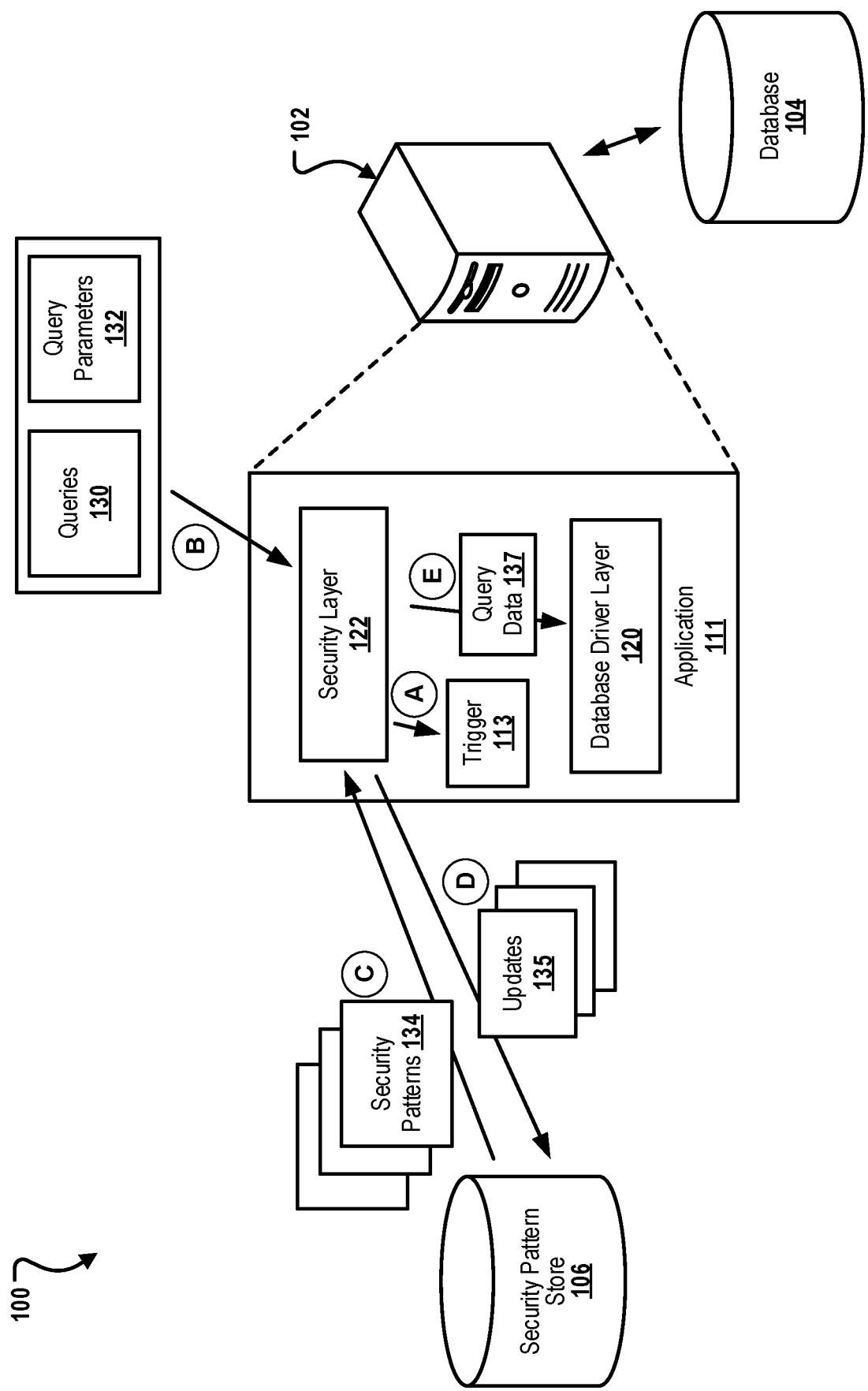
FIGS. 1A, 1B, and 1C illustrate a system for mitigation of injection security attacks against non-relational databases, according to an implementation of the present disclosure.
Figure 1B:
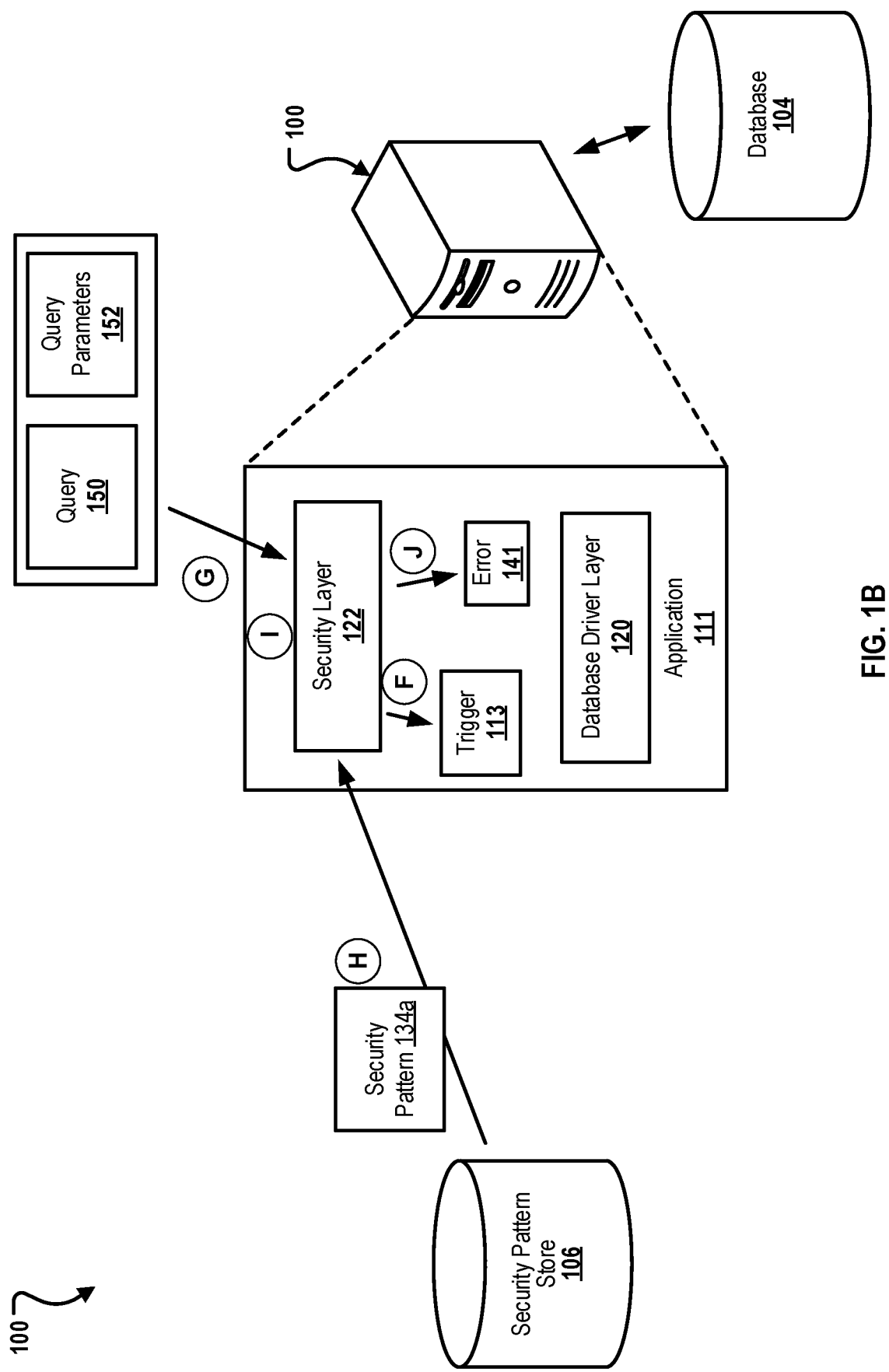
Figure 1C:
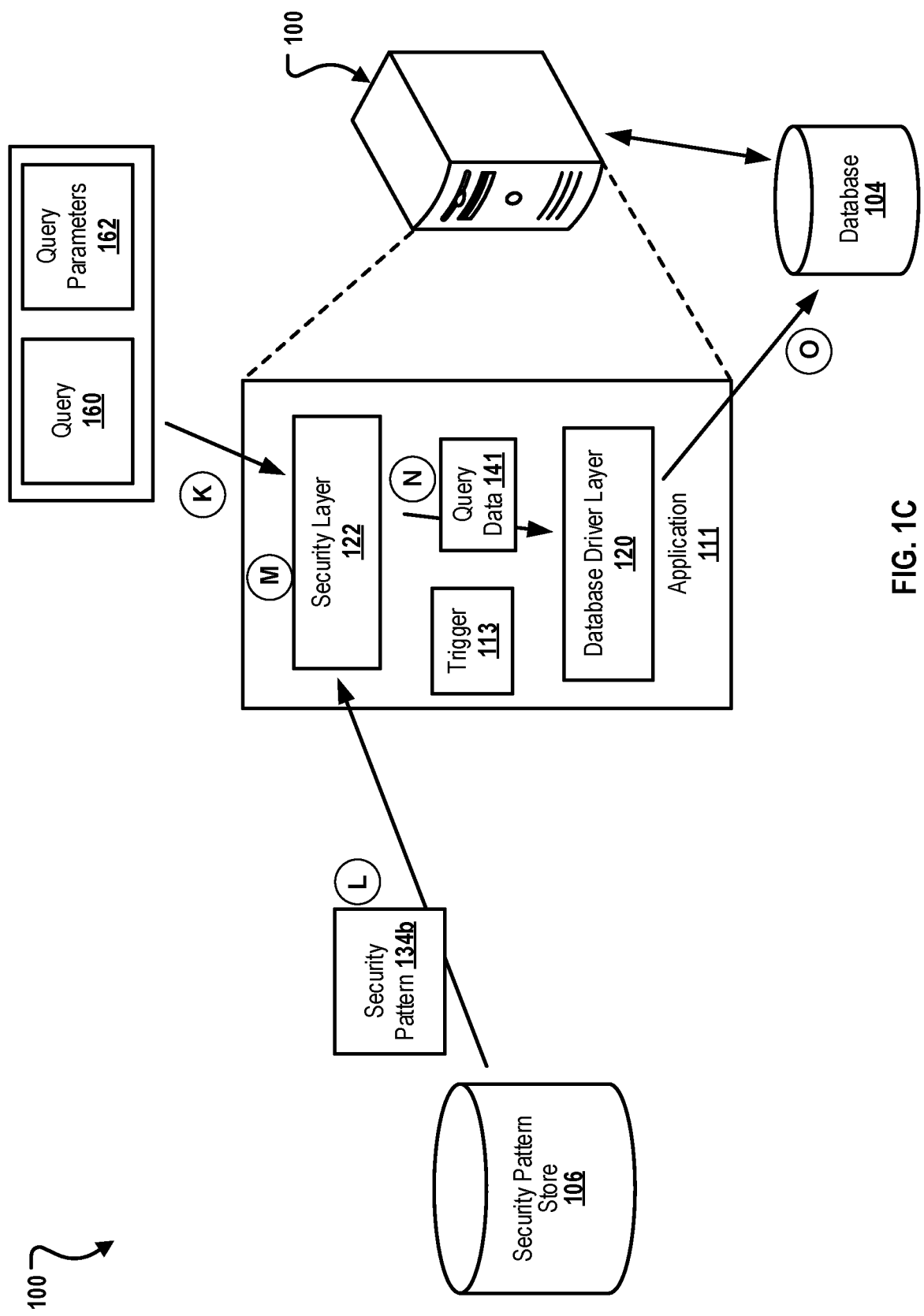

FIGS. 1A, 1B, and 1C illustrates a system 100 for mitigation of injection security attacks against non-relational databases, according to an implementation of the present disclosure. The system 100 includes a computing device 102, a database 104, and a security pattern store 106.

The computing device 102 can be associated with a computer-executable application 111. The computing device 102 can be in communication with the database 104 and the security pattern store 106, for example, over a network. The database 104 and the security pattern store 106 can include one or more physical storage devices located in one or more physical locations. In some implementations, the database 104 is a non-relational database. In some implementations, the database 104 is a NOSQL database. The computing device 102, utilizing the application 111, can interface with the database 104, including providing queries to the database 104 to identify data stored by the database 104. The queries can be subjected to security analysis.

Generally, the system 100 provides a pattern-based control mechanism for query parameterization. Patterns can be used to define a range of allowed query structures such that all other patterns of queries are blocked. In short, in a first part (a "learning phase"), the system 100 can "learn" particular patterns in a secure execution environment of the application 111, such that, in the environment, only valid queries are expected without injection attacks on the database 104. In a second part (an "execution phase"), the application 111 is enabled such that pattern validation is activated. Thereby, the previously "learned" security patterns are activated and only matching queries are executed against the database 104, and all other queries are blocked.

The application 111 can be associated with a software architecture pattern having multiple layers, including a database driver layer 120 and a security layer 122. To that end, the computing device 102 can integrate the security layer 122 with the database driver layer 120 to minimize, if not avoid, object structure and type injections of the database 104 (for example, security vulnerabilities of the database 104). In some implementations, the integration of the security layer 122 with the database driver layer 120 can include wrapping the database driver layer 120 with the security layer 122. As a result of such wrapping, any interface and method names of the database driver layer 120 are maintained, and a syntax-level compatibility with any existing computer-executable programming code is provided. The application 111 can include any non-relational database program, including a NOSQL database program. For example, the application 111 can include MONGODB or the NODEJS program. When integrating the security layer 122 with the database driver layer 120, the computing device 102 can replace the dependency of the database driver layer 120 with the security layer 122. For example, the import of the database 104 can be changed from "var db=require ('mongo')" to "var db=require ('mongo secured')" to indicate the security layer 122.

System 100 can initially be employed in the "learning phase" to "learn" one or more security patterns in a secure execution environment of the application 111. The "learning phase" can be described with respect to steps A-E, described with respect to FIG. 1A.

Referring to FIG. 1A, at step A, the security layer 122 sets a trigger 113 associated with the security layer 122 to implement a learning phase of the security layer 122. In some implementations, the trigger 113 is an environmental variable. For example, the trigger 113 can be set to "MONGO_LEARN=true" or that "env.learn==true."

At step B, the computing system 102 can, in response to the trigger 113 being set, receive a plurality of queries 130 and query parameters 132 associated with the respective queries 130. For example, a query and query parameters can include "connection.find (param1, param2, . . . , callback)." In some implementations, the computing system 102 receives a single query 130 and query parameters 132 associated with the single query 130.

At step C, he computing system 102, for each query of at least a subset of the queries 130, identifies a previously-stored security pattern 134 based on the query 130 and the associated query parameters 132. Specifically, in response to the receiving the plurality of queries 130 and the associated query parameters 132, the application 111 determines that the state of the trigger 113 associated with the security layer 122 is set to "true," and the application 111 determines whether the security pattern store 106 includes a respective security pattern 134 for each of the queries 130 and query parameters 132. For example, for the query pattern 134 "connection.find (param1, param2, . . . , callback)," the application 111 identifies the corresponding security pattern 134 and implements the function "learnPattern (param1, param2, . . . )." In some implementations, the computing system 102 implements machine learning to identity the security patterns 134.

At step D, the computing system 102, for each query of the subset of queries 130, updates the corresponding identified security pattern 134 based on the associated query parameters 132. Specifically, for each query of the subset of queries 130, the identified security pattern 134 that corresponds to the respective query 130 is updated (or extended) with the data structure and type of the associated query parameters 132 (illustrated as updates 135).

In some implementations, the computing device 102, and in particular, the application 111, for a particular query 130, determines that a previously-stored security pattern 134 is not associated with the particular query 130 and the associated query parameters 132. That is, the security pattern store 106 does not include a security pattern 134 associated with the particular query 130 and associated query parameters 132. To that end, in response to determining that a previously-stored security pattern 134 is not associated with the particular query 130 and the associated query parameters 132, the application 111 generates a new security pattern 134 based on the particular query 130 and the associated query parameters 132. For example, the application 111 can generate (initialize) an empty security pattern 134 with the data structure and type of the query parameters 132 associated with the particular query 130. The generated security pattern 134 can be stored by the security pattern store 106.

At step E, in some implementations, the security layer 122 forwards each of the queries of the subset of queries 130 to the database driver layer 120. Specifically, the security layer 122 passes each of the queries of the subset of queries 130 and the associated query parameters 132 of each of the queries 130 to the database driver layer 120 (illustrated as query data 137).

After the system 100 completes the "learning phase," the system 100 progresses to the "execution phase." That is, the previously "learned" security patterns are activated and only matching queries can be executed against the database 104. Non-matching queries are blocked. The "execution phase" is described with respect to steps F-O of FIGS. 1B and 1C.

Referring to FIG. 1B, the security layer 122 resets the trigger 113 associated with the security layer 122 to implement an execution phase of the security layer 122, at step F. For example, the trigger 113 can be set to "MONGO_LEARN=false" or that "env.learn==false." In some implementations, the trigger 113 associated with the security layer 122 is reset after updating the security patterns 132, as described in step D of FIG. 1A.

At step G, the computing system 102 can, in response to the trigger 113 being reset, receive an additional query 150 and additional query parameters 152 associated with the additional query 150.

At step H, the computing system 102 identifies a particular security pattern 134a that is associated with the additional query 150 and the additional query parameters 152. Specifically, in response to the receiving of the additional query 150 and the associated query parameters 152, the application 111 determines that the state of the trigger 113 associated with the security layer 122 is set to "false," and the application 111 identifies the particular security pattern 134a. For example, for the additional query 150, the application 111 identifies the particular security pattern 134a and implements the function "checkPattern (param1, pattern1, param2, pattern2, . . . )." In some implementations, the computing system 102 implements machine learning to identity the particular security pattern.

At step I, in some implementations, the security layer 122 determines that at least one of the additional query parameters 152 does not match the corresponding query parameter of the particular security pattern 134a. Specifically, the security layer 122 can determine that a single parameter of the additional query parameters 152 does not match the corresponding parameter of the particular security pattern 134a—for example, the additional query 150 does not exhibit an expected format. For example, the security layer 122 determines that "checkPattern( )==false"—indicating that a query parameter 152 does not match a corresponding query parameter of the particular security pattern 134a.

At step J, in some implementations and in response to determining that the at least one of the additional query parameters 152 does not match the corresponding query parameter of the particular security pattern 134a, the security layer 122 triggers a security error 141 for the database 104. The security error 141 can indicate a potential injection attack against the database 104.

Referring to FIG. 1C, at step K, the computing device 102 can receive a second additional query 160 and second additional query parameters 162 associated with the second additional query 162.

As described at step F and in some implementations, the computing system device 102 receives the second additional query 160 and the second additional query parameters 162 in response to the trigger 113 being reset.

At step L, the security layer 122 identifies a specific security pattern 134b from the plurality of security patterns that is associated with the second additional query 162 and the second additional query parameters 162. Specifically, in response to the receiving the second additional query 160 and the second additional query parameters 162, the security layer 122 determines that the state of the trigger 113 associated with the security layer 122 is set to "false," and the security layer 122 identifies the specific security pattern 134b.

At step M, the security layer 122 determines that each of the second additional query parameters 162 match a corresponding query parameter of the specific security pattern 134b. Specifically, the security layer 122 can determine that the second additional query 160 exhibits an expected format. For example, the security layer 122 determines that "checkPattern( )==true"—indicating that each of the second additional query parameters 162 match corresponding query parameters of the specific security pattern 134b.

At step N, in some implementations, in response to determining that each second additional query parameter 162 matches the corresponding query parameter of the specific query pattern 134b, the security layer 122 provides the second additional query 160 and the second additional query parameters 162 to the database driver layer 104 (illustrated as query data 141).

At step O, in some implementations, the database driver layer 104 executes the second additional query 160 against the database 104.

Figure 2:
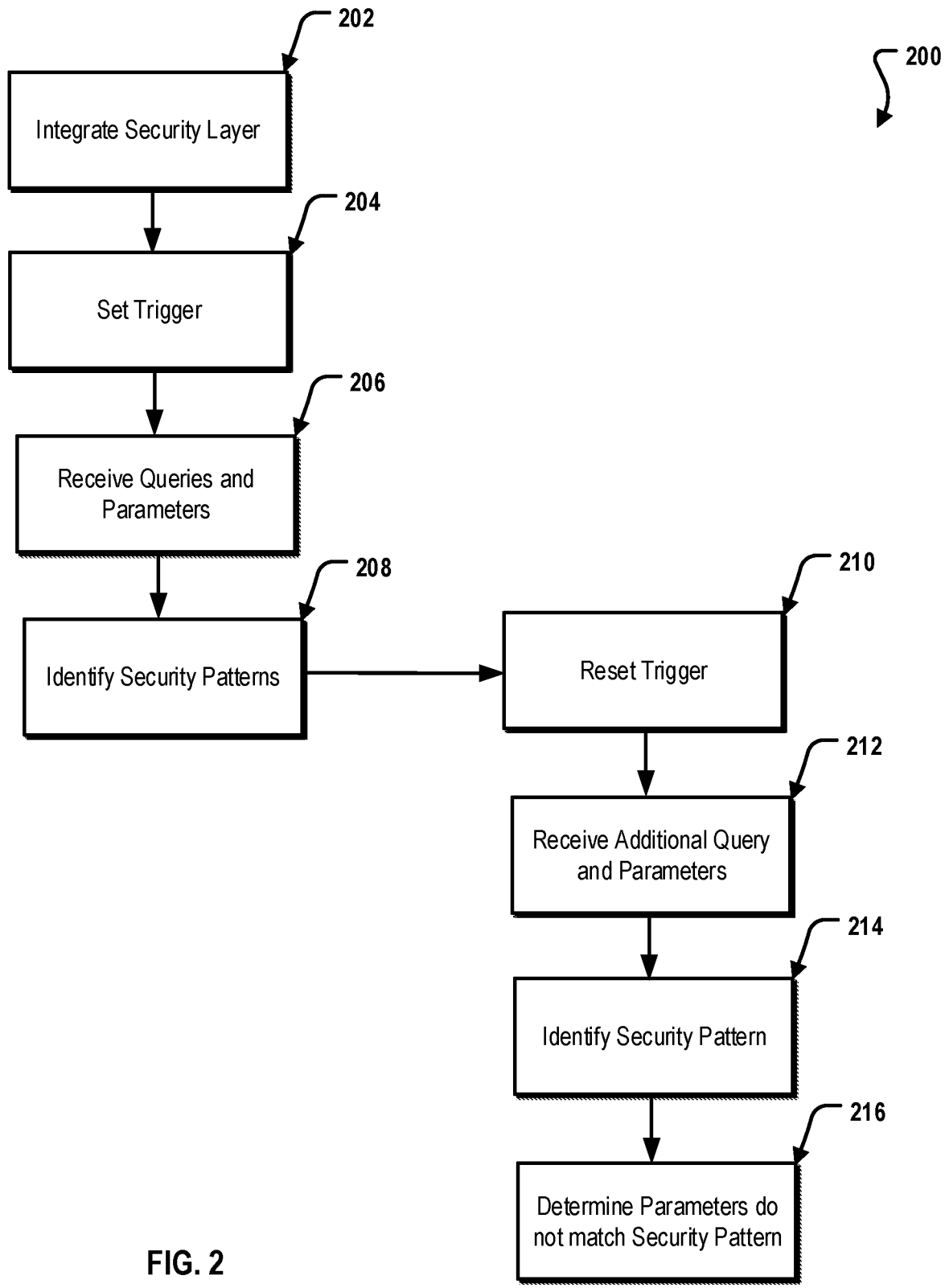
FIG. 2 is a flowchart illustrating an example of a computer-implemented method for the mitigation of injection security attacks against non-relational databases, according to an implementation of the present disclosure.

FIG. 2 is a flowchart illustrating an example of a computer-implemented method 200 for the mitigation of injection security attacks against non-relational databases, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, the computing system 102 integrates the security layer 122 with the database driver layer 120. From 202, the method 200 proceeds to 204.

At 204, the security layer 122 sets the trigger 113 to implement the learning phase of the security layer 122. For example, the trigger can be set to "MONGO_LEARN=true" or that "env.learn==true." From 204, the method 200 proceeds to 206.

At 206, the computing system 102, in response to the trigger 113 being set, receives a plurality of queries 130 and query parameters 132 associated with the respective queries 130. From 206, the method 200 proceeds to 208.

At 208, the security layer 122, for each query of at least a subset of the plurality of queries 130, identifies a previously-stored security pattern from a plurality of security patterns 134 based on the query 130 and the associated query parameters 132. From 208, the method 200 proceeds to 210.

At 210, the security layer 122 resets the trigger 112 to implement an execution of the security patterns 134. For example, the trigger can be set to "MONGO_LEARN=false" or that "env.learn==false." From 210, the method 200 proceeds to 212.

At 212, the computing system 102, in response to the trigger 113 being reset, receives an additional query 150 and additional query parameters 152 associated with the additional query 150. From 212, the method 200 proceeds to 214.

At 214, the computing system 102 identifies a particular security pattern 134a that is associated with the additional query 150 and the additional query parameters 152. From 214, the method 200 proceeds to 216.

At 216, the security layer 122 determines that at least one of the additional query parameters 152 does not match a corresponding query parameter of the particular security pattern 134a. For example, the computing system 102 determines that "checkPattern( )==false"—indicating that a query parameter 152 does not match a corresponding query parameter of the particular security pattern 134a. After 216, method 200 stops.

Figure 3:
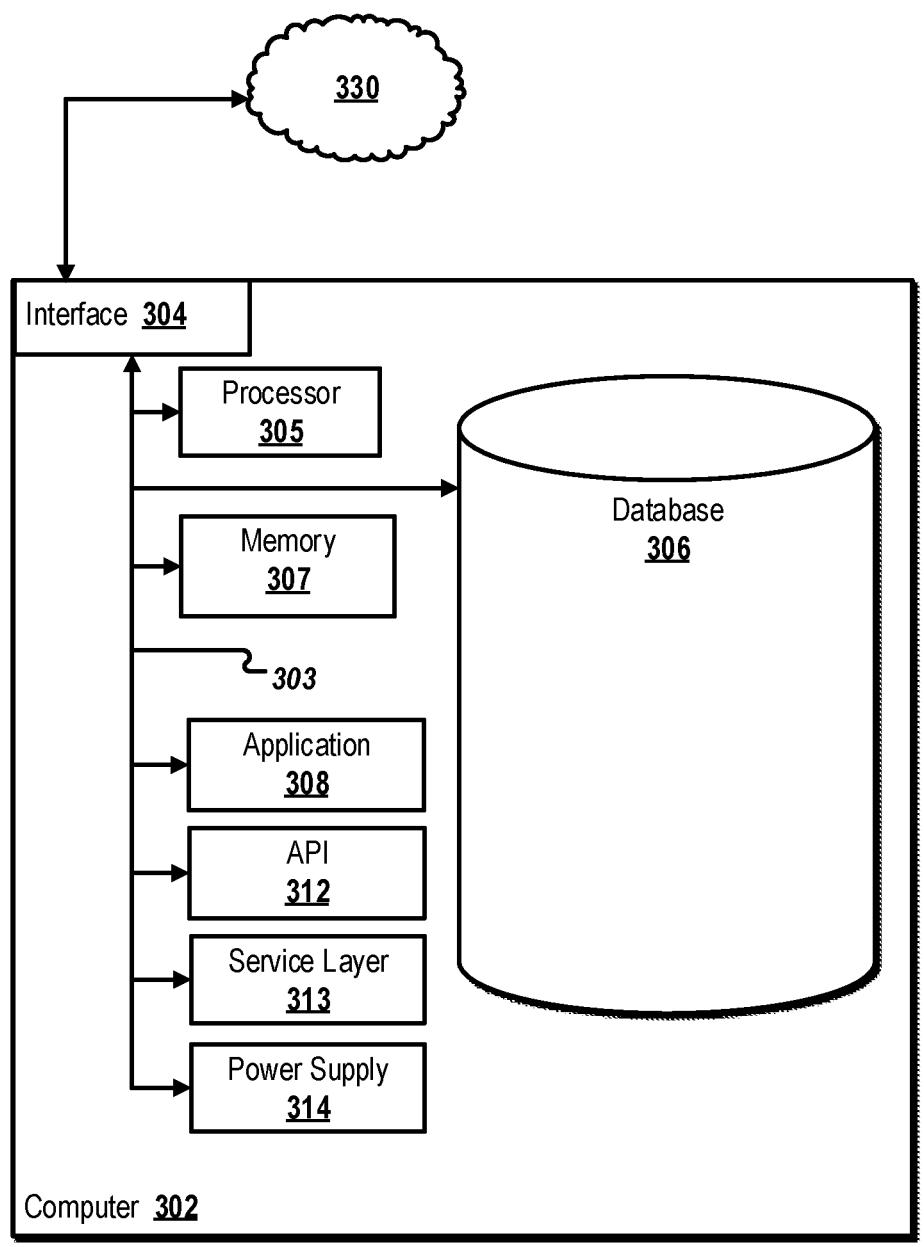
FIG. 3 is a block diagram illustrating an example of a computer-implemented system used to provide computational functionalities associated with described algorithms, methods, functions, processes, flows, and procedures, according to an implementation of the present disclosure, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing the subject matter described in the present disclosure. The illustrated Computer 302 is communicably coupled with a Network 330. In some implementations, one or more components of the Computer 302 can be configured to operate within an environment, including cloud-computing-based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, e-mail server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, conventional, or another type of database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method comprising integrating a database driver layer with a security layer; setting a trigger associated with the security layer to implement a learning phase of the security layer; in response to enabling the trigger, receiving a plurality of queries and query parameters associated with the respective queries; for each query of at least a subset of the plurality of queries, identifying a previously-stored security pattern from a plurality of security patterns based on the query and the associated one or more query parameters; resetting the trigger associated with the security layer to implement an execution of the security patterns; in response to resetting the trigger, receiving an additional query and one or more additional query parameters associated with the additional query; identifying a particular security pattern from the plurality of security patterns that is associated with the additional query and the additional one or more query parameters; and determining that at least one of the additional query parameters does not match a corresponding query parameter of the particular security pattern.

The foregoing and other described implementations can each, optionally, include one or more of the following features.

A first feature, combinable with any of the following features, further comprising integrating the database driver layer with the security layer for mitigation of injection security attacks of a non-relational database associated with the database driver layer.

A second feature, combinable with any of the previous or following features, further comprising in response to determining that at least one of the additional query parameters does not match the corresponding query parameter of the particular security pattern, triggering a security error for the non-relational database.

A third feature, combinable with any of the previous or following features, wherein the non-relational database is a NOSQL database.

A fourth feature, combinable with any of the previous or following features, further comprising for each query of at least a subset of the plurality of queries, updating the identified security pattern based on the associated one or more query parameters.

A fifth feature, combinable with any of the previous or following features, wherein the trigger associated with the security layer is reset after updating the identified security pattern.

A sixth feature, combinable with any of the previous or following features, for each query of at least a different subset of the plurality of queries, determining that that a security pattern is not associated with the query and the associated one or more query patterns, and in response, generating a new security pattern based on the query and the associated one or more queries.

A seventh feature, combinable with any of the previous or following features, further comprising in response to resetting the trigger, receiving a second additional query and one or more second additional query parameters associated with the second additional query; identifying a specific security pattern from the plurality of security patterns that is associated with the second additional query and the one or more second additional query parameters; and determining that each second additional query parameter matches a corresponding query parameter of the specific security pattern.

An eighth feature, combinable with any of the previous or following features, further comprising in response to determining that each second additional query parameter matches the corresponding query parameter of the specific security pattern, providing the second additional query to the database driver layer.

A ninth feature, combinable with any of the previous or following features, further comprising executing the second additional query against a non-relational database associated with the database driver layer.

In a second implementation, a non-transitory, computer-readable medium storing one or more instructions executable by a computer system to perform operations comprising integrating a database driver layer with a security layer; setting a trigger associated with the security layer to implement a learning phase of the security layer; in response to enabling the trigger, receiving a plurality of queries and query parameters associated with the respective queries; for each query of at least a subset of the plurality of queries, identifying a previously-stored security pattern from a plurality of security patterns based on the query and the associated one or more query parameters; resetting the trigger associated with the security layer to implement an execution of the security patterns; in response to resetting the trigger, receiving an additional query and one or more additional query parameters associated with the additional query; identifying a particular security pattern from the plurality of security patterns that is associated with the additional query and the additional one or more query parameters; and determining that at least one of the additional query parameters does not match a corresponding query parameter of the particular security pattern.

The foregoing and other described implementations can each, optionally, include one or more of the following features.

A first feature, combinable with any of the following features, wherein integrating further includes integrating the database driver layer with the security layer for mitigation of injection security attacks of a non-relational database associated with the database driver layer.

A second feature, combinable with any of the previous or following features, the operations further comprising in response to determining that at least one of the additional query parameters does not match the corresponding query parameter of the particular security pattern, triggering a security error for the non-relational database.

A third feature, combinable with any of the previous or following feature, the operations further comprising for each query of at least a subset of the plurality of queries, updating the identified security pattern based on the associated one or more query parameters.

A fourth feature, combinable with any of the previous or following features, wherein the trigger associated with the security layer is reset after updating the identified security pattern.

A fifth feature, combinable with any of the previous or following features, for each query of at least a different subset of the plurality of queries, determining that that a security pattern is not associated with the query and the associated one or more query patterns, and in response, generating a new security pattern based on the query and the associated one or more queries.

A sixth feature, combinable with any of the previous or following features, the operations further comprising in response to resetting the trigger, receiving a second additional query and one or more second additional query parameters associated with the second additional query; identifying a specific security pattern from the plurality of security patterns that is associated with the second additional query and the one or more second additional query parameters; and determining that each second additional query parameter matches a corresponding query parameter of the specific security pattern.

A seventh feature, combinable with any of the previous or following features, the operations further comprising in response to determining that each second additional query parameter matches the corresponding query parameter of the specific security pattern, providing the second additional query to the database driver layer.

In a third implementation, a computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising integrating a database driver layer with a security layer; setting a trigger associated with the security layer to implement a learning phase of the security layer; in response to enabling the trigger, receiving a plurality of queries and query parameters associated with the respective queries; for each query of at least a subset of the plurality of queries, identifying a previously-stored security pattern from a plurality of security patterns based on the query and the associated one or more query parameters; resetting the trigger associated with the security layer to implement an execution of the security patterns; in response to resetting the trigger, receiving an additional query and one or more additional query parameters associated with the additional query; identifying a particular security pattern from the plurality of security patterns that is associated with the additional query and the additional one or more query parameters; and determining that at least one of the additional query parameters does not match a corresponding query parameter of the particular security pattern.

The foregoing and other described implementations can each, optionally, include one or more of the following features.

A first feature, combinable with any of the following features, wherein integrating further includes integrating the database driver layer with the security layer for mitigation of injection security attacks of a non-relational database associated with the database driver layer.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   integrating a database driver layer with a security layer;
   setting a trigger associated with the security layer to implement a learning phase of the security layer;
   in response to enabling the trigger, receiving a plurality of queries and query parameters associated with the respective queries;
   for each query of at least a subset of the plurality of queries, identifying a previously-stored security pattern from a plurality of security patterns based on the query and the associated one or more query parameters;
   resetting the trigger associated with the security layer to implement an execution of the security patterns;
   in response to resetting the trigger, receiving an additional query and one or more additional query parameters associated with the additional query;

identifying a particular security pattern from the plurality of security patterns that is associated with the additional query and the additional one or more query parameters; and determining that at least one of the additional query parameters does not match a corresponding query parameter of the particular security pattern.

2. The computer-implemented method of claim 1, wherein integrating further includes integrating the database driver layer with the security layer for mitigation of injection security attacks of a non-relational database associated with the database driver layer.

3. The computer-implemented method of claim 2, further comprising in response to determining that at least one of the additional query parameters does not match the corresponding query parameter of the particular security pattern, triggering a security error for the non-relational database.

4. The computer-implemented method of claim 3, wherein the non-relational database is a NOSQL database.

5. The computer-implemented method of claim 1, further comprising for each query of at least a subset of the plurality of queries, updating the identified security pattern based on the associated one or more query parameters.

6. The computer-implemented method of claim 5, wherein the trigger associated with the security layer is reset after updating the identified security pattern.

7. The computer-implemented method of claim 1, for each query of at least a different subset of the plurality of queries, determining that that a security pattern is not associated with the query and the associated one or more query patterns, and in response, generating a new security pattern based on the query and the associated one or more queries.

8. The computer-implemented method of claim 1, further comprising:
in response to resetting the trigger, receiving a second additional query and one or more second additional query parameters associated with the second additional query;
identifying a specific security pattern from the plurality of security patterns that is associated with the second additional query and the one or more second additional query parameters; and
determining that each second additional query parameter matches a corresponding query parameter of the specific security pattern.

9. The computer-implemented method of claim 8, further comprising in response to determining that each second additional query parameter matches the corresponding query parameter of the specific security pattern, providing the second additional query to the database driver layer.

10. The computer-implemented method of claim 9, further comprising executing the second additional query against a non-relational database associated with the database driver layer.

11. A non-transitory, computer-readable medium storing one or more instructions executable by a computer system to perform operations comprising:
integrating a database driver layer with a security layer;
setting a trigger associated with the security layer to implement a learning phase of the security layer;
in response to enabling the trigger, receiving a plurality of queries and query parameters associated with the respective queries;
for each query of at least a subset of the plurality of queries, identifying a previously-stored security pattern from a plurality of security patterns based on the query and the associated one or more query parameters;

resetting the trigger associated with the security layer to implement an execution of the security patterns;
in response to resetting the trigger, receiving an additional query and one or more additional query parameters associated with the additional query;
identifying a particular security pattern from the plurality of security patterns that is associated with the additional query and the additional one or more query parameters; and
determining that at least one of the additional query parameters does not match a corresponding query parameter of the particular security pattern.

12. The computer-readable medium of claim 11, wherein integrating further includes integrating the database driver layer with the security layer for mitigation of injection security attacks of a non-relational database associated with the database driver layer.

13. The computer-readable medium of claim 12, the operations further comprising in response to determining that at least one of the additional query parameters does not match the corresponding query parameter of the particular security pattern, triggering a security error for the non-relational database.

14. The computer-readable medium of claim 11, the operations further comprising for each query of at least a subset of the plurality of queries, updating the identified security pattern based on the associated one or more query parameters.

15. The computer-readable medium of claim 14, wherein the trigger associated with the security layer is reset after updating the identified security pattern.

16. The computer-readable medium of claim 11, for each query of at least a different subset of the plurality of queries, determining that that a security pattern is not associated with the query and the associated one or more query patterns, and in response, generating a new security pattern based on the query and the associated one or more queries.

17. The computer-readable medium of claim 11, the operations further comprising:
in response to resetting the trigger, receiving a second additional query and one or more second additional query parameters associated with the second additional query;
identifying a specific security pattern from the plurality of security patterns that is associated with the second additional query and the one or more second additional query parameters; and
determining that each second additional query parameter matches a corresponding query parameter of the specific security pattern.

18. The computer-readable medium of claim 17, the operations further comprising in response to determining that each second additional query parameter matches the corresponding query parameter of the specific security pattern, providing the second additional query to the database driver layer.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
integrating a database driver layer with a security layer;
setting a trigger associated with the security layer to implement a learning phase of the security layer;

in response to enabling the trigger, receiving a plurality of queries and query parameters associated with the respective queries;

for each query of at least a subset of the plurality of queries, identifying a previously-stored security pattern from a plurality of security patterns based on the query and the associated one or more query parameters;

resetting the trigger associated with the security layer to implement an execution of the security patterns;

in response to resetting the trigger, receiving an additional query and one or more additional query parameters associated with the additional query;

identifying a particular security pattern from the plurality of security patterns that is associated with the additional query and the additional one or more query parameters; and determining that at least one of the additional query parameters does not match a corresponding query parameter of the particular security pattern.

20. The system of claim 19, wherein integrating further includes integrating the database driver layer with the security layer for mitigation of injection security attacks of a non-relational database associated with the database driver layer.

* * * * *